United States Patent
Shyam et al.

(10) Patent No.: US 9,617,159 B2
(45) Date of Patent: Apr. 11, 2017

(54) PROCESS FOR SYNTHESIZING REDUCED GRAPHENE OXIDE ON A SUBSTRATE FROM SEEDLAC

(71) Applicants: Tata Steel Limited, Jamshedpur (IN); Council of Scientific and Industrial Research, New Delhi (IN)

(72) Inventors: Kumar Choudhary Shyam, Jamshedpur (IN); Kumar Bhadu Manish, Jamshedpur (IN); Kumar Rout Tapan, Jamshedpur (IN); Das Sumitesh, Jamshedpur (IN); Kumar Sahu Ranjan, New Delhi (IN); Narayan Singhbabu Yashabanta, New Delhi (IN); Kumar Pramanick Ashit, New Delhi (IN); Chandra Srivastava Vikas, New Delhi (IN)

(73) Assignees: Council of Scientific and Industrial Research, New Delhi (IN); Tata Steel Limited, Jamshedpur (IN)

( * ) Notice: Subject to any disclaimer, the term of this patent is extended or adjusted under 35 U.S.C. 154(b) by 7 days.

(21) Appl. No.: 14/767,959

(22) PCT Filed: May 8, 2014

(86) PCT No.: PCT/IN2014/000310
§ 371 (c)(1),
(2) Date: Aug. 14, 2015

(87) PCT Pub. No.: WO2015/040630
PCT Pub. Date: Mar. 26, 2015

(65) Prior Publication Data
US 2016/0185604 A1 Jun. 30, 2016

(30) Foreign Application Priority Data
Sep. 17, 2013 (IN) .......................... 1074/KOL/2013

(51) Int. Cl.
*B05D 3/04* (2006.01)
*C01B 31/04* (2006.01)
(Continued)

(52) U.S. Cl.
CPC .......... *C01B 31/043* (2013.01); *B05D 3/0466* (2013.01); *B05D 7/14* (2013.01);
(Continued)

(58) Field of Classification Search
CPC ........ B05D 3/0466; B05D 7/14; B05D 7/542; B05D 7/544; B05D 7/582; B05D 7/584; C01B 31/0446; C03C 17/32; C09D 193/00
See application file for complete search history.

(56) References Cited

U.S. PATENT DOCUMENTS

2007/0023746 A1 2/2007 Birau et al.
2009/0110627 A1 4/2009 Choi et al.
(Continued)

FOREIGN PATENT DOCUMENTS

WO 2012064102 A3 5/2012

OTHER PUBLICATIONS

Ruan et al "Growth of Graphene from Food, Insects, and Waste" ACS NANO, vol. 5, No. 9, p. 7601-7607, (2011).*
(Continued)

*Primary Examiner* — Nathan Empie
(74) *Attorney, Agent, or Firm* — The Webb Law Firm (57) ABSTRACT

The present invention relates to synthesizing reduced graphene oxide on the surface of a metal sheet and glass. The invention particularly relates to a process for coating a substrate with reduced graphene oxide using seedlac as a carbon source. As per the process of the current invention, a solution of seedlac is prepared in an alcohol and the substrate is dipped in to the solution for one or more time.
(Continued)

The substrate is then dried in air for 1-10 minutes and thereafter, heated to a temperature range of 400 to 1200° C. under controlled atmosphere of $Ar/N_2/Ar$—$H_2/N_2$—$H_2$ at a different flow rate ranging from 100 to 500 seem for a period of 10 to 120 minutes.

22 Claims, 11 Drawing Sheets

(51) Int. Cl.
    *C09D 193/00*     (2006.01)
    *B05D 7/14*     (2006.01)
    *B05D 7/00*     (2006.01)
    *C03C 17/32*     (2006.01)
    *B82Y 40/00*     (2011.01)

(52) U.S. Cl.
    CPC ............ *B05D 7/542* (2013.01); *B05D 7/544* (2013.01); *B05D 7/582* (2013.01); *B05D 7/584* (2013.01); *C01B 31/0446* (2013.01); *C03C 17/32* (2013.01); *C09D 193/00* (2013.01); *B82Y 40/00* (2013.01); *C03C 2217/20* (2013.01); *C03C 2218/111* (2013.01); *C03C 2218/32* (2013.01)

(56) References Cited

U.S. PATENT DOCUMENTS

2010/0021708 A1    1/2010    Kong et al.
2011/0104442 A1    5/2011    Yoon et al.
2013/0143067 A1    6/2013    Kim et al.
2013/0156678 A1    6/2013    Banerjee et al.

OTHER PUBLICATIONS

Dreyer et al., "From Conception to Realization: An Historical Account of Graphene and Some Perspectives for Its Future", Agnew. Chem. Int. Ed., 2010, vol. 49, pp. 9336-9345.
Lee et al., "Measurement of the Elastic Properties and Intrinsic Strength of Monolayer Graphene", Science, 2008, vol. 321, pp. 385-388.
Lin et al., "Efficient reduction of graphene oxide catalyzed by copper", Phys. Chem. Chem. Phys., 2012, vol. 14, pp. 3083-3088.
Morozov et al., "Giant Intrinsic Carrier Mobilities in Graphene and Its Bilayer", Phys. Rev. Lett., 2008, pp. 1-5.
Novoselov et al., "Electric Field Effect in Atomically Thin Carbon Films", Science, 2004, vol. 306, pp. 666-669.
Novoselov et al., "Two-dimensional gas of massless Dirac fermions in graphene", Nature, 2005, vol. 438, No. 10, pp. 197-200.
Prasai et al., "Graphene: Corrosion-Inhibiting Coating", ACS Nano, 2012, vol. 6, No. 2, pp. 1102-1108.
Ray et al., "Preparation and characterization of graphene and Ni-decorated graphene using flower petals as the precursor material", Carbon, 2012, vol. 50, pp. 4123-4129.
Sun et al., "Growth of graphene from solid carbon sources", Nature, Nov. 25, 2010, vol. 468, pp. 549-552.
Yi Lih et al., "Facile Corrosion Protection Coating from Graphene", International Journal of Chemical Engineering and Applications, Dec. 2012, vol. 3, No. 6, pp. 453-455.
Wang et al., "Transparent Conductive Graphene Electrodes for Dye-Sensitized Solar Cells", Nano Letters, American Chemical Society, 2008, vol. 8, No. 1, pp. 323-327.

* cited by examiner

|  | Fe | O | C | Si | Mn |
|---|---|---|---|---|---|
| 001[] | 58.60 | 3.33 | 28.35 | 1.16 | 8.56 |
| 002[] | 84.51 | 3.20 |  | 0.76 | 11.54 |
| Average | 71.55 | 3.26 | 28.35 | 0.96 | 10.05 |
| Standard deviation | 9.16 | 0.05 | 0.00 | 0.14 | 1.05 |

|  | C | Ni |
|---|---|---|
| 001[] | 1.22 | 98.78 |
| 002[] | 1.24 | 98.76 |
| 003[] | 0.80 | 99.20 |
| Average | 1.09 | 98.91 |
| Standard deviation | 0.17 | 0.17 |

| Chemical | ms% | mol% | Sigma | Net | K ratio | Line |
|---|---|---|---|---|---|---|
| C | 18.93 | 27.39 | 0.38 | 37319 | 0.0000000 | K |
| O | 47.34 | 51.42 | 0.42 | 300169 | 0.0000000 | K |
| Na | 2.09 | 1.58 | 0.29 | 37716 | 0.0000000 | K |
| Al | 1.16 | 0.75 | 0.25 | 29479 | 0.0000000 | K |
| Si | 30.48 | 18.86 | 0.29 | 766331 | 0.0000000 | K |
| Total | 100.00 | 100.00 | | | | |

PROCESS FOR SYNTHESIZING REDUCED GRAPHENE OXIDE ON A SUBSTRATE FROM SEEDLAC

CROSS-REFERENCE TO RELATED APPLICATIONS

This application is the United States national phase of International Application No. PCT/IN2014/000310 filed May 8, 2014, and claims priority to Indian Patent Application No. 1074/KOL/2013 filed Sep. 17, 2013, the disclosures of which are hereby incorporated in their entirety by reference.

FIELD OF THE INVENTION

The present invention relates to a process for developing a coating of reduced graphene oxide on the surface of a large metal sheet and glass. This process comprises coating of seedlac and Ni-seedlac solution on the metal surface followed by heating under controlled atmosphere.

BACKGROUND OF THE INVENTION

Graphene is an allotrope of carbon, which contains a single atomic $sp^2$ carbon arranged in honeycomb fashion making a two-dimensional sheet. This material exhibits various unusual properties such high electron mobility ($2\times10^5$ $cm^2$ $V^{-1}$ $s^{-1}$) at room temperature, thermal conductivity ($5\times10^5$ $Wm^{-1}K^{-1}$) and high Young's modulus (~1 TPa) [Science, 306, 666, 2004; Nature, 438, 197, 2005; Phys. Rev. Lett., 100, 016602, 2008; Science, 321, 385, 2008]. Besides, coating of graphene over the surface of metal improves the corrosion resistance of metal [ACS Nano, 6, 1102, 2012]. Moreover, the properties of graphene have been tailored by substituting heteroatom like oxygen on the graphene sheet. Such graphene with the heteroatom has been coined as a "reduced graphene oxide" in the literature (Angew Chem. Int. Ed. 49, 9336, 2010). Several methods have been reported in the literature for the deposition of graphene on metal surface, which includes chemical vapor deposition (CVD) method. However, CVD process is expensive and is incapable of a large scale production.

Several methodologies have been patented on coating of graphene or reduced graphene oxide on the surface of metals sheets. US 20130143067 A1 discusses about coating of graphene on metal plates such as steel, aluminum, copper and its wire by using chemical vapor deposition and spray technique. The spray technique uses polymer mixed reduced graphene oxide, which is to be a composite instead of pure reduced graphene oxide. Therefore, the metal sheet coated with the composite will have different properties than the metal coated with the pure reduced graphene oxide. Reference may also be made to a patent US 20090110627 A1, wherein the synthesis of graphene sheet is made from different carbon sources, which includes carbon monoxide, alcohols and polycyclic aromatic compounds. US 20110104442 A1, also describes deposition of graphene by CVD method directly on substrates using carbon sources other than graphite. US 20100021708 A1 discloses the deposition of graphene on a $SiO_2$/Si substrate. However, the deposition process is very slow because it involves several coating and chemical etching steps.

Sun et al. reported the growth of graphene from Poly (methyl methacrylate) (PMMA) and sucrose on Cu substrate [Nature 468, 549, 2010]. WO 2012064102 A3 disclosed the coating of graphene on steel using acetylene gas as a carbon source. Reference may also be made to a patent US13704054 A1, which claimed coating of graphene on steel surface for corrosion resistance. This method comprises the synthesis of reduced graphene oxide from graphite powder by oxidation-reduction process followed by mixing with polyimide. Subsequently, the reduced graphene oxide-polyimide composite was coated on the steel surface. However, process is time consuming and polyimide has poor adherence to steel surface. In light of the above discussed references, it is evident that graphene coating has been disclosed and developed using various carbon sources and CVD technique however, the large scale production remain a challenge.

On the other hand, coating of graphene by solution method is well established [Int. J. Chem. Eng. App., 3, 453, 2012] and is capable of a large scale production. The solution method follows the following procedure; (a) graphite powder needs to be oxidized to minimize the vander Walls forces between the two graphitic layers, (b) the prepared graphite oxide is dispersed in water by sonication, (c) the dispersed graphite oxide solution is reduced using the reducing agents such as hydrazine, HI acid, $NaBH_4$, citric acid etc. (d) the reduced product is dispersed in a suitable organic solvent and is used for coating. But, this method involves several disadvantages that limit the process to be used at industrial scale for the following reason; the conversion of graphite powder to graphite oxide involves several steps which is time consuming and uses some harmful acids like $HNO_3$ and $H_2SO_4$. Further, reducing agents are also toxic, handling them in large scale is a problem and the reduced product has a very low dispersity in organic solvent and hence, requires sonication for a long time. Also, the adherence of the graphene sheets with the metal surface is very low. Besides, the graphite used for the carbon source is expensive.

Some reports show that natural carbon source like flower petal can be used to produce graphene in a large scale at low cost [Carbon 50, 4123, 2012]. However, graphene produced from natural sources finds difficulty to integrate on the metal/alloy surfaces, therefore, finds limited application in the area of graphene coated metal sheets.

Hence, there is need of an invention that can synthesize graphene at large scale using available carbon sources. Further, process should be cost effective and commercially viable.

OBJECTS OF THE INVENTION

An object of the present invention is to provide a process for the coating of reduced graphene oxide on a metal substrate.

Another object of the invention is to synthesize reduced graphene oxide at large scale using a commercially viable method.

Another object of the invention is to develop a process of synthesizing reduced graphene oxide using chemicals that are not hazardous in nature.

One more object of the invention is to synthesize reduced graphene oxide using naturally available carbon resources.

Still another object of the invention is to develop a reduced graphene oxide formulation that can be applied using simple coating techniques such as dip coating.

BRIEF DESCRIPTION OF THE DRAWINGS

FIG. 14 TEM micrograph of the reduced graphene oxide sheet with SAED pattern.

SUMMARY OF THE INVENTION

The present invention provides a process for developing a reduced graphene oxide coating on a metallic substrate such as steel, copper, zinc, nickel, aluminum and alloys thereof. The coating can be further developed on a glass substrate as well. The current process comprises dip coating of the substrate in seedlac or seedlac-Nickel chloride ($NiCl_2$) solution followed by heating in the range under controlled atmosphere. The seedlac or seedlac-$NiCl_2$ solution is prepared in a C1-C4 alcohol such as methanol, ethanol, isopropanol or tert-butyl alcohol. Preferably, a C2-C4 alcohol is used. The substrate is dipped in to the seedlac or seedlac-Nickel chloride ($NiCl_2$) solution one or more times and then dried in air. The dried substrate is then heated under controlled atmosphere of $Ar/N_2/Ar$—$H_2/N_2$—$H_2$ at a different flow rate ranging from 100 to 500 sccm for a period of 10 to 120 minute.

DESCRIPTION OF THE INVENTION

Figure 1:
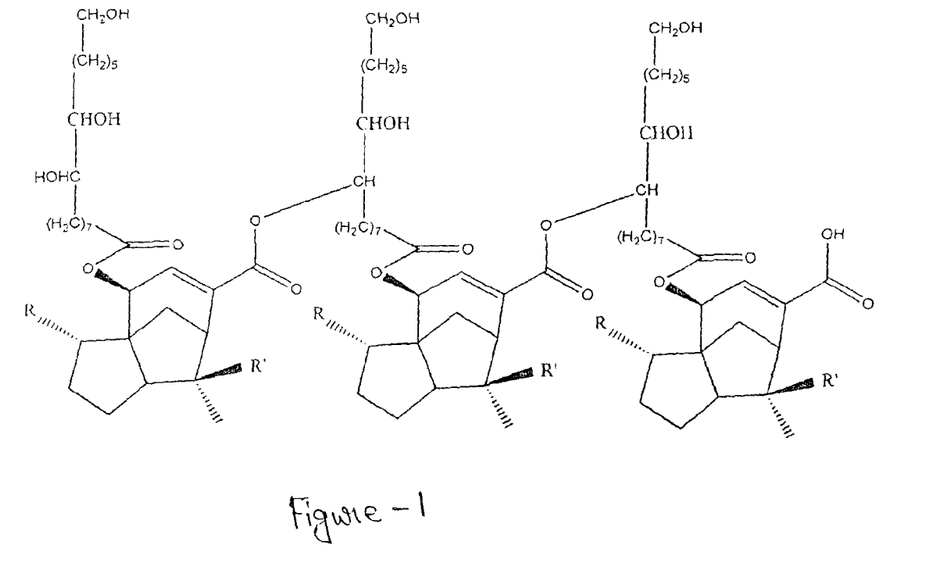
FIG. 1 depicts chemical structure of seedlac.
Figure 2:
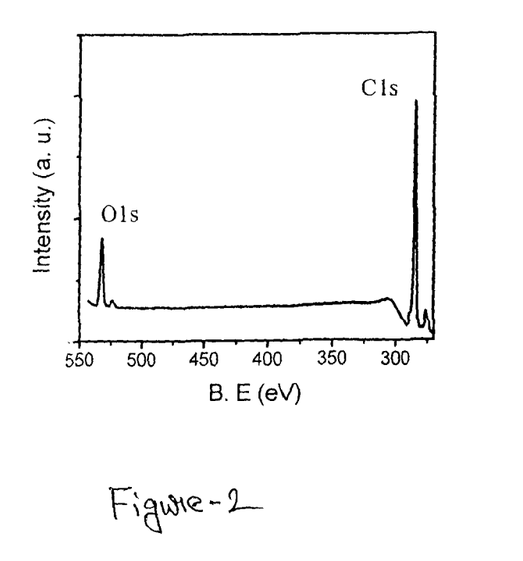
FIG. 2 is a XPS spectrum of seedlac.
Figure 3:
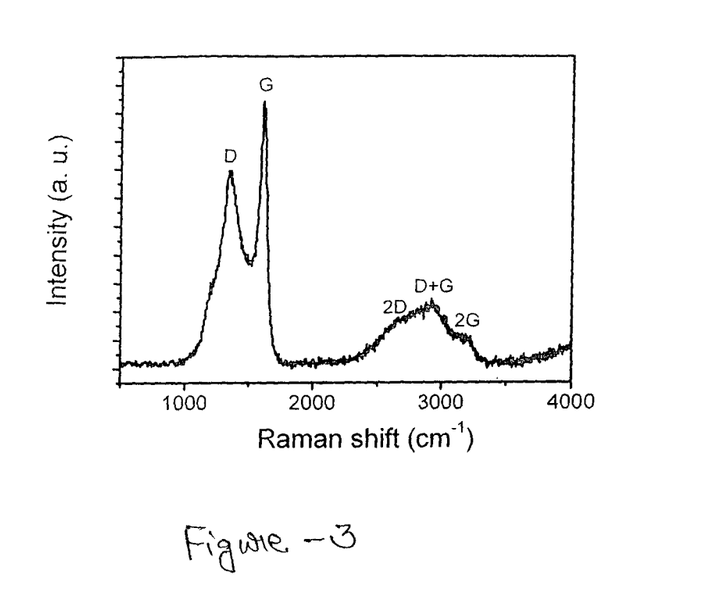
FIG. 3 is a Raman spectrum of reduced graphene oxide coated steel.
Figure 4:
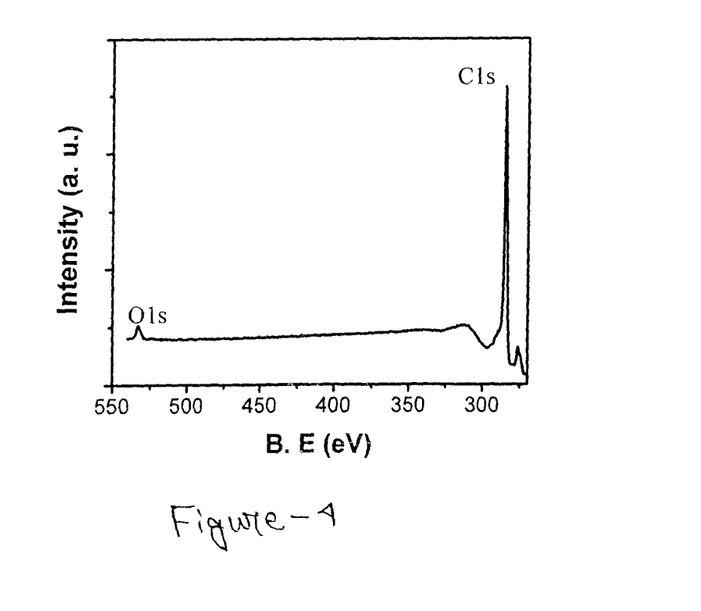
FIG. 4 XPS spectrum of reduced graphene oxide coated steel.
Figure 5:
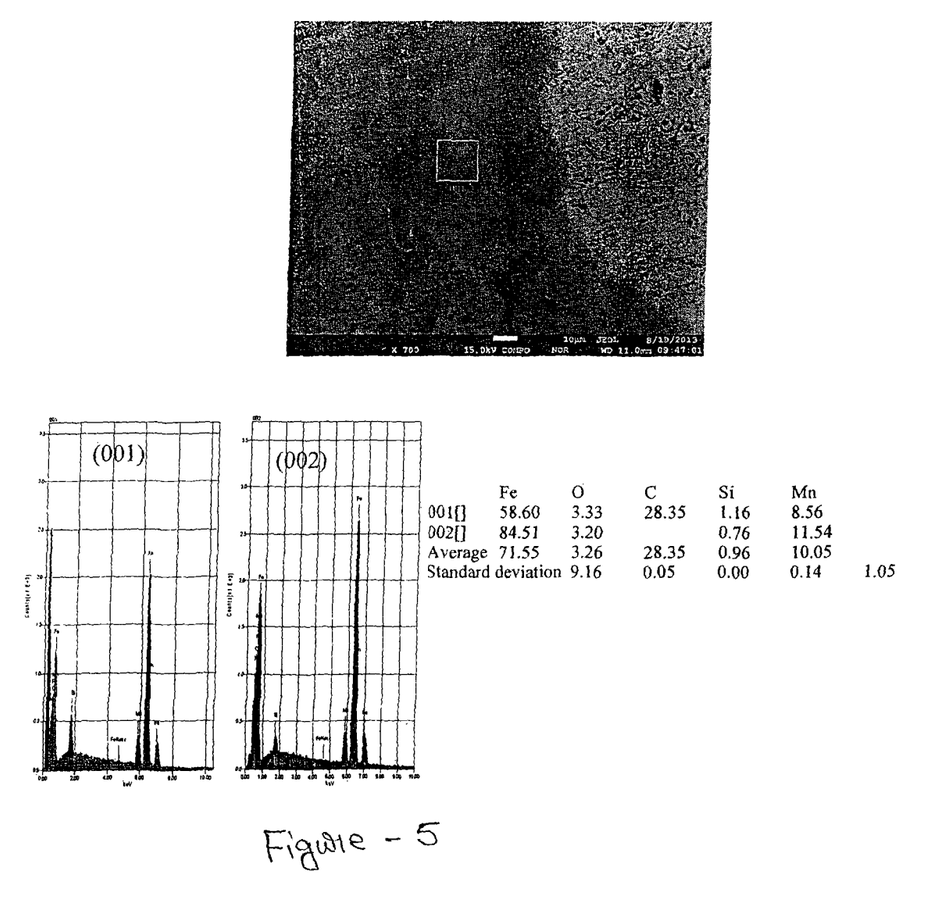
FIG. 5 Backscattered image with EDX analysis of reduced graphene oxide coated steel.
Figure 6:
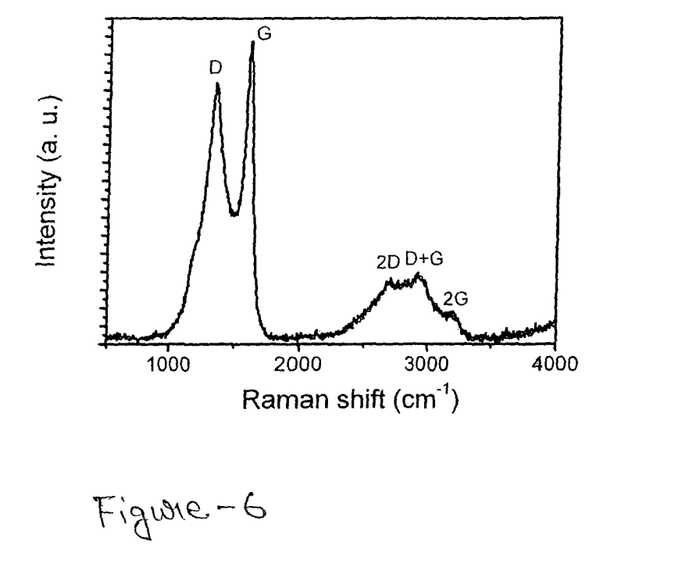
FIG. 6 Raman spectrum of reduced graphene oxide coated on oxidized steel.
Figure 7:
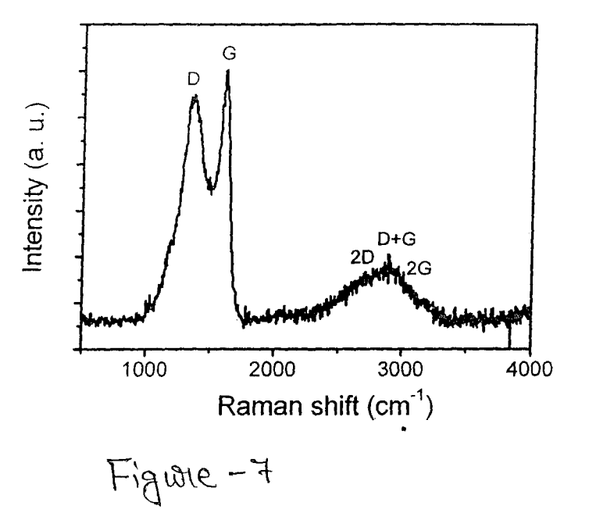
FIG. 7 Raman spectrum of reduced graphene oxide coated Cu.
Figure 8:
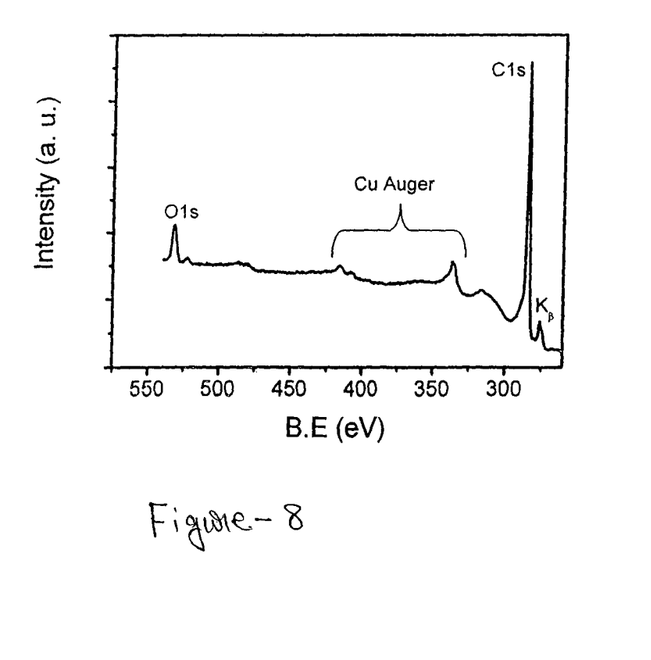
FIG. 8 XPS spectrum of reduced graphene oxide coated Cu.
Figure 9:
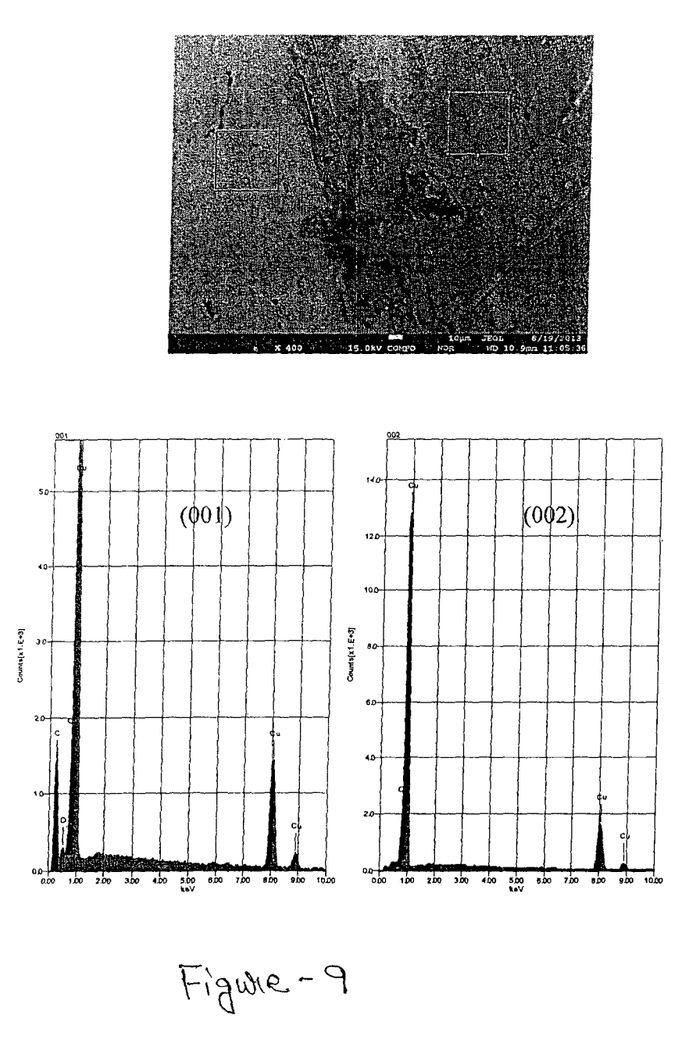
FIG. 9 Backscattered image of reduced graphene oxide coated Cu with EDX analysis.

Graphene with some oxygen content was termed as reduced graphene oxide. Graphene variant as per the current invention also contains oxygen content and hence, has been termed reduced graphene oxide throughout the invention. Seedlac is a natural adhesive gum and is also known as natural varnish. Seedlac contains cyclic six and five membered carbon rings with a long aliphatic chain attached hydroxyl and acetate functional groups as depicted in FIGS. 1 & 2. Current invention makes use of seedlac as carbon source for synthesis of reduced graphene oxide. Seedlac can be transformed to reduced graphene oxide under optimized experimental conditions, as the bond rearrangement occurs through removal of hydroxyl functional groups on heating. This process overcomes some of the above problems associated with the large area coating of graphene on metal surface.

In an embodiment of the present invention, the process for coating of reduced graphene oxide on a substrate comprises:
(i) Preparation of seedlac solution in an alcohol. In an embodiment of the invention, alcohol is selected from ethanol, isopropanol, tert-butyl alcohol and a mixture thereof. Methanol can also be used however, it is toxic compared to C2-C4 alcohols. The concentration of seedlac solution varies in the range of 10-100 gram/liter of the alcohol. The seedlac solution is prepared by heating seedlac in the C2-C4 alcohal at a temperature ranging between 60 to 90° C. for a period of 10 to 60 minutes to prepare a homogeneous solution.

(ii) Coating of the viscous seeldlac solution on the substrate. In an embodiment of the current invention, the substrate is selected from steel, copper, nickel and alloys thereof. In another embodiment of the invention, the substrate is glass. The coating thickness of seedlac solution on the substrate surface is controlled by varying the number of dipping of the substrate in the seedlac solution. In an embodiment of the current invention, the substrate is dipped in the seedlac solution in the range of 1 to 20 times. The substrate is dried in air atmosphere for a period of 1 to 10 minutes after each dipping.

(iii) Heating the seedlac coated substrate in the temperature range of 400 to 1200° C. under controlled atmosphere of $Ar/N_2/Ar$—$H_2/N_2$—$H_2$ at a different flow rate ranging from 100 to 500 sccm for a period of 10 to 120 minutes. In an embodiment of the current invention, substrate can be heated using an electro-heating furnace.

In an embodiment of the current invention, Nickel chloride ($NiCl_2$) is added to the seedlac solution in the weight ranging from 0.001 g to 0.1 g per volume of 100 to 1000 ml seedlac solution. Coating thickness of reduced graphene oxide on the substrate was observed in the range of 2-100 nm.

The following examples are given by way of illustration of the working of the invention in actual practice and therefore should not be construed to limit the scope of the present invention.

Example-1

Seedlac solution was made by adding 2 g of seedlac in isopropanol solvent of volume in the range of 100 to 500 ml at a temperature ranging between 60 to 90° C. The seedlac solution was coated over the surface of steel, copper, zinc, nickel, aluminum and their alloys by dip coating followed by air drying at room temperature. The thickness of coating layer was varied by the number of dippings. The coated metal sheets and glass were heated using an electro-heating furnace in the temperature range of 400 to 1200° C. under controlled atmosphere of $Ar/N_2/Ar$—$H_2/N_2$—$H_2$ at the flow rate of 100 to 500 sccm for a period of 10 to 120 minutes. The heated surface of steel, copper, zinc, nickel, aluminum and alloys was characterized using Raman spectroscopy, X-ray photoelectron spectroscopy and electron microscopy (FIG. 3-9).

Example 2

Seedlac solution was prepared adding 2 g of seedlac in isopropanol solvent of volume in the range of 100 to 500 ml at a temperature ranging between 60 to 90° C. $NiCl_2$-seedlac solution was made by adding $NiCl_2$ of weight ranging from 0.001 g to 0.1 g in seedlac solution of a volume between 100 to 1000 ml. The resulting solution was coated over the surface of steel, copper, zinc, nickel, aluminum, alloys and glass by dip coating followed by air drying at room temperature. The coated metal sheets and glass were heated using an electro-heating furnace in the temperature range of 400 to 1200° C. under controlled atmosphere of $Ar/N_2/Ar$—

Figure 10:
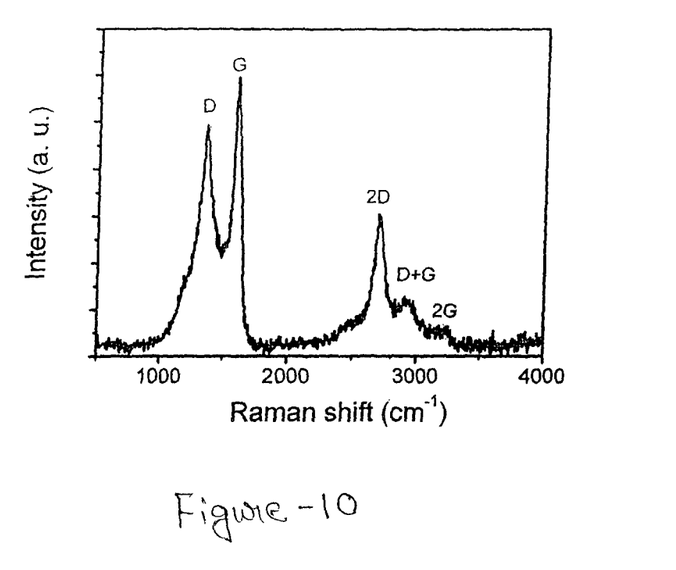
FIG. 10 Raman spectrum of reduced graphene oxide coated steel. The coating is developed using Seedlac and $NiCl_2$ solution.
Figure 11:
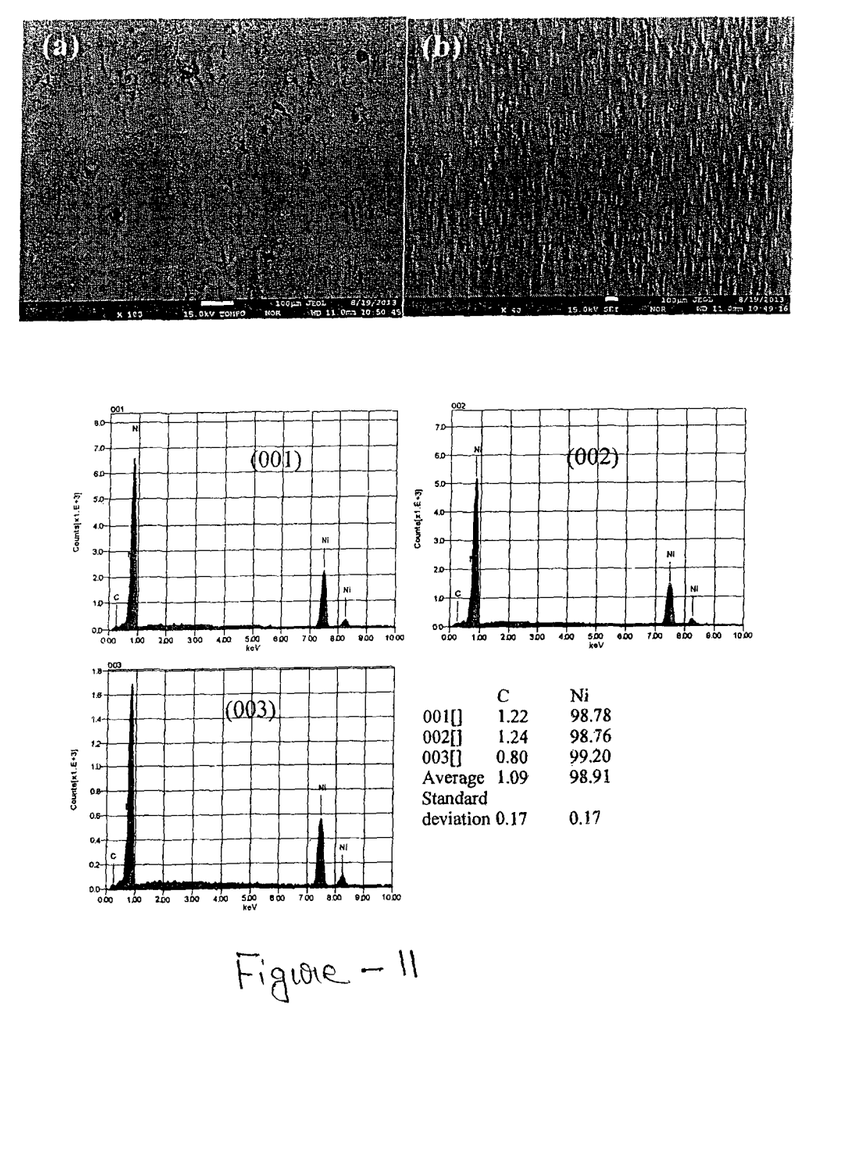
FIG. 11 Backscattered and secondary images of reduced graphene oxide coated Nickel sheet with EDX analysis.

$H_2/N_2$—$H_2$ at the flow rate of 100 to 500 sccm for a period of 10 to 120 minutes. The heated metal sheets and glass were characterized using Raman spectroscopy and X-ray photoelectron spectroscopy (FIGS. 10 & 11).

Example 3

Figure 12:
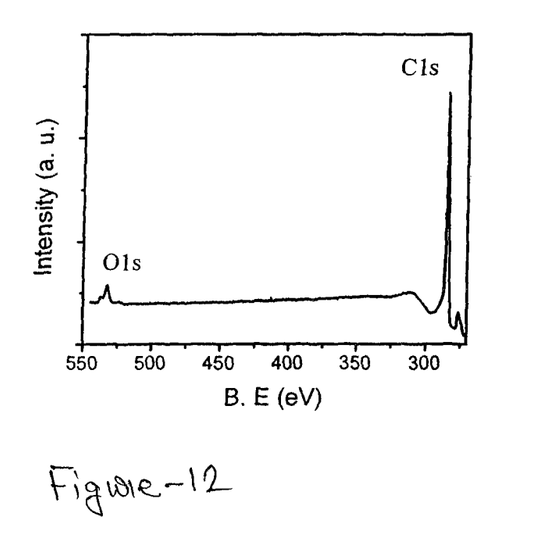
FIG. 12, XPS data of reduced graphene oxide coated glass.
Figure 13:
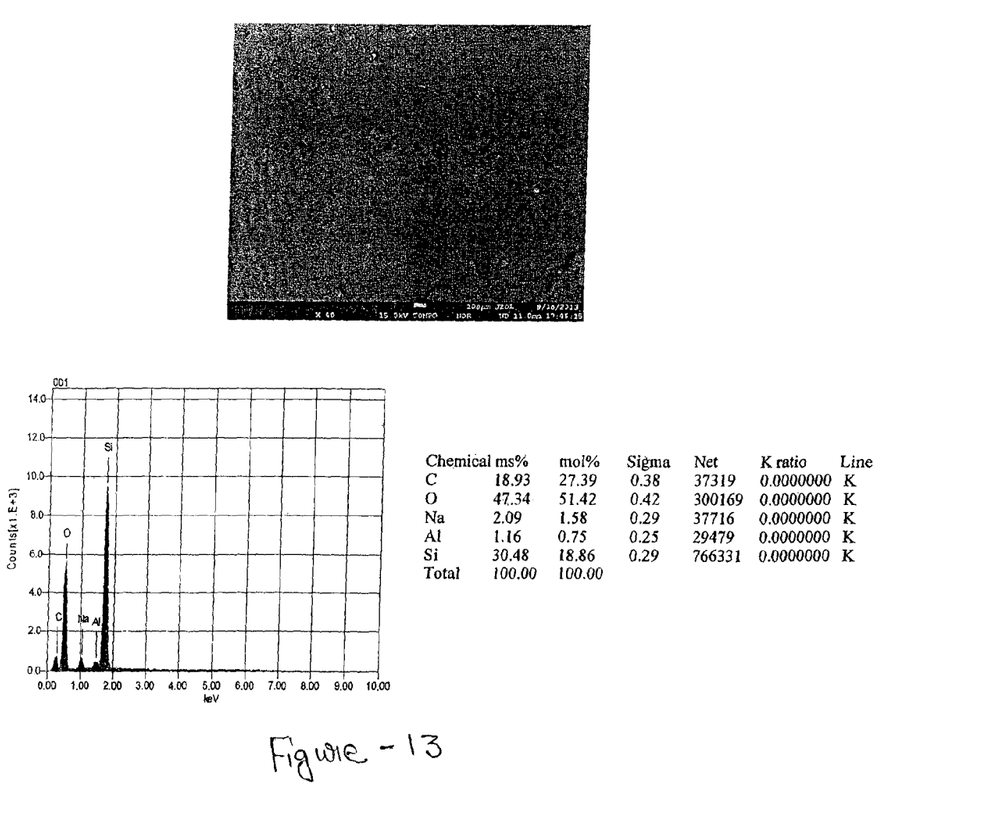
FIG. 13 Backscattered image of reduced graphene oxide coated glass with EDX analysis.
Figure 19:
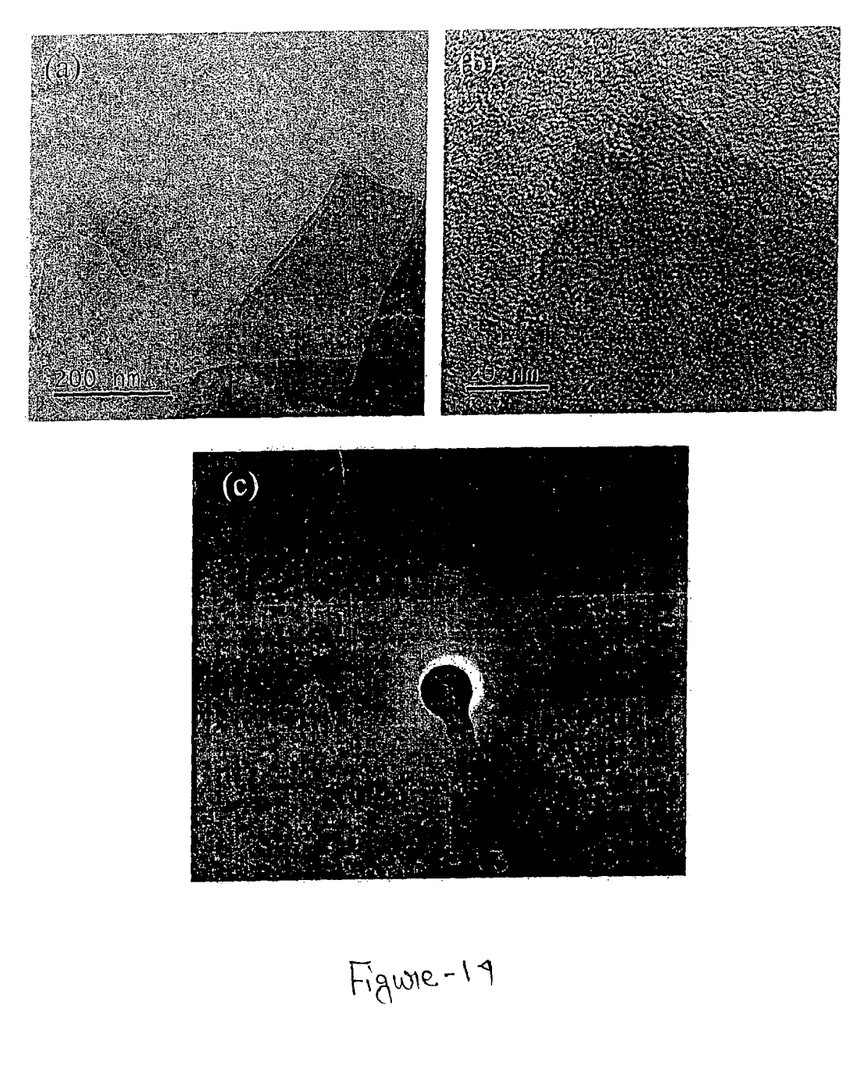

Seedlac solution was made by adding 2 g of seedlac in isopropanol solvent of volume in the range of 100 to 500 ml at a temperature ranging between 60 to 90° C. The seedlac solution was coated over the glass surface by dip coating followed by air drying at room temperature. The thickness of coating layer was varied by the number of dipping. The coated metal sheets and glass were heated using an electro-heating furnace in the temperature range of 400 to 1200° C. under controlled atmosphere of $Ar/N_2/Ar$—$H_2/N_2$—$H_2$ at the flow rate of 100 to 500 sccm for a period of 10 to 120 minutes. The heated surface of steel, copper, zinc, nickel, aluminum, alloys and glass was characterized using X-ray photoelectron spectroscopy and electron microscopy (FIG. 12-14).
  (i) The XPS data of the coated reduced graphene oxide exhibits the carbon to oxygen (C/O) ratio of better than 39:1 and the full width half maxima of C1s is less than 1.4 eV.
  (ii) The Raman data of the coated reduced graphene oxide exhibits the $I_D/I_G$ value of less than 0.8.
  (iii) The observed number of layers in reduced graphene oxide is around 10 from TEM and Raman data (Nature Nanotech., 8, 235 (2013).
  (iv) The sheet resistance of the reduced graphene oxide over glass is less than 3 kOhm.

The current process of synthesizing reduced graphene oxide coating on a substrate has a number of advantages. The process uses seedlac as a natural carbon source for direct coating of reduced graphene oxide on a metal surface. The process of coating is very simple and can be easily adapted to coat steel surfaces or any other metallic surface. Further, the process does not make use of any hazardous chemicals and hence, is an environmentally process. It was further tested and validated that currentin/ocess can be used to coat reduced graphene oxide even on oxidized steel surface.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

We claim:

1. A process for synthesizing reduced graphene oxide from seedlac on a substrate, the process comprising:
  preparing a seedlac solution in a C2-C4 alcohol;
  dipping the substrate into the seedlac solution one or more times; and
  heating the substrate in the temperature range of 400° C. to 1200° C. under a controlled atmosphere of Ar, $N_2$, Ar—$H_2$, and/or $N_2$—$H_2$ at the flow rate of 100 to 500 sccm for a period of 10 to 120 minutes.

2. The process as claimed in claim 1, wherein the substrate is a metallic sheet.

3. The process as claimed in claim 2, wherein the metallic sheet is made of a material selected from the group consisting of steel, copper, zinc, nickel, aluminium and the alloys thereof.

4. The process as claimed in claim 1, wherein the substrate is a glass sheet.

5. The process as claimed in claim 1, wherein the C2-C4 alcohol is selected from the group consisting of ethanol, isopropanol and a mixture thereof.

6. The process as claimed in claim 1, wherein the substrate is an oxidized steel surface.

7. The process as claimed in claim 1 further comprising a step of drying the substrate after each dipping into the seedlac solution by keeping the substrate in an air atmosphere for a period of 1 to 10 minutes.

8. The process as claimed in claim 1, wherein the seedlac solution is prepared by heating seedlac in the C2-C4 alcohol at a temperature ranging between 60° C. to 90° C. for a period of 10 to 60 minutes.

9. The process as claimed in claim 1 further comprising the step of adding nickel chloride to the seedlac solution in the C2-C4 alcohol.

10. The process as claimed in claim 1, wherein the concentration of seedlac is in the range of 10-100 gram/liter of the C2-C4 alcohol.

11. The process as claimed in claim 1, wherein the substrate is heated using an electro-heating furnace.

12. A process for coating a substrate with reduced graphene oxide, the process comprising:
  preparing a seedlac solution in a C2-C4 alcohol;
  dipping the substrate in to the seedlac solution one or more times; and heating the substrate in the temperature range of 400° C. to 1200° C. under controlled atmosphere of Ar, $N_2$, Ar—$H_2$, and/or $N_2$—$H_2$ at a flow rate of 100 to 500 sccm for a period of 10 to 120 minutes; wherein a coating thickness of the reduced graphene oxide is in the range of 2-100 nm.

13. The process as claimed in claim 12, wherein the substrate is a metallic sheet.

14. The process as claimed in claim 13, wherein the metallic sheet is made of a material selected from the group consisting of steel, copper, zinc, nickel, aluminium and the alloys thereof.

15. The process as claimed in claim 12, wherein the substrate is a glass sheet.

16. The process as claimed in claim 12, wherein the C2-C4 alcohol is selected from the group consisting of ethanol, isopropanol and a mixture thereof.

17. The process as claimed in claim 12, wherein the substrate is an oxidized steel surface.

18. The process as claimed in claim 12 further comprising a step of drying the substrate after each dipping into the seedlac solution by keeping the substrate in an air atmosphere for a period of 1 to 10 minutes.

19. The process as claimed in claim 12 further comprising the step of adding nickel chloride to the seedlac solution in the C2-C4 alcohol.

20. The process as claimed in claim 12, wherein the seedlac solution is prepared by heating seedlac in C2-C4 alcohol at a temperature ranging between 60° C. to 90° C. for a period of 10 to 60 minutes.

21. The process as claimed in claim 12, wherein the substrate is heated using an electro-heating furnace.

22. The process as claimed in claim 12, wherein the concentration of seedlac is in the range of 10-100 gram/liter of C2-C4 alcohol.

* * * * *